United States Patent [19]
Morris

[11] Patent Number: 6,085,780
[45] Date of Patent: Jul. 11, 2000

[54] VALVE MANIFOLD BOX AND METHOD OF MAKING SAME

[76] Inventor: James M Morris, 18 Munroe Dr., East Hampstead, N.H. 03826

[21] Appl. No.: 09/170,231

[22] Filed: Oct. 13, 1998

[51] Int. Cl.[7] .................................................. F16L 5/00
[52] U.S. Cl. .................... 137/377; 137/360; 137/559; 137/315; 312/229
[58] Field of Search .................................. 137/360, 377, 137/559, 315, 15, 382; 312/229

[56] References Cited

U.S. PATENT DOCUMENTS

| | | | |
|---|---|---|---|
| 3,831,624 | 8/1974 | Doumany | 137/360 |
| 4,158,471 | 6/1979 | Logsdon | 312/229 |
| 4,637,422 | 1/1987 | Izzi, Sr. | 137/360 |
| 4,913,183 | 4/1990 | Vogel et al. | 137/15 |
| 5,253,670 | 10/1993 | Perrott | 137/360 |
| 5,381,902 | 1/1995 | Dumser et al. | 206/523 |
| 5,555,907 | 9/1996 | Philipp | 137/312 |
| 5,875,812 | 3/1999 | Miller | 137/360 |

*Primary Examiner*—A. Michael Chambers
*Attorney, Agent, or Firm*—Paul E Milliken; Ray L Weber; Lee A Germain

[57] ABSTRACT

A manifold box adapted to contain manifolds for valves controlling the flow of potentially hazardous liquids. This is a rotationally cast sealed plastic box enclosing the valves to contain any leaks from the valves and allow any leaking liquid to drain from the box through a drain tube at the bottom of the box to prevent the liquid from leaking onto surfaces below or adjacent to the valves. Attachment engaging "tee-nuts" are cast in place within the walls of the box and fittings for tubing connections are spin welded to the walls of the box. The box has a front access opening sealingly closed by a hinged plastic cover panel. In one embodiment the box is rectangular and is designed with two adjacent sloping walls which permit drainage of liquid from the box into a drain tube regardless of whether the box is mounted vertically or horizontally. In another embodiment the box is square and has one sloping wall containing a drain connected to a drain pipe.

19 Claims, 9 Drawing Sheets

VALVE MANIFOLD BOX AND METHOD OF MAKING SAME

FIELD OF THE INVENTION

This invention relates to a manifold box containing manifolds for valves controlling the flow of potentially hazardous liquids. More specifically this is a sealed box enclosing the valves to contain any leaks from the valve and allow any leaking liquid to drain from the box through a drain tube at the bottom of the box to prevent the liquid from leaking onto surfaces below or adjacent to the box.

BACKGROUND OF THE INVENTION

It is known in the prior art to provide sealed junction boxes containing either electrical wiring, plumbing or both and which contain and divert leaking liquid so that it will not damage adjacent surfaces or equipment.

A typical example is shown in U.S. Pat. No. 5,555,907 issued to Harald Philipp which shows an enclosure divided into two compartments with one containing electronic circuitry and the other containing liquid controlling valves. The compartments are divided by a slanted wall which causes any water leaks to drain from the enclosure without contacting the electronic equipment.

Another example of such an enclosure is a washing machine outlet box which is shown in U.S. Pat. No. 3,831,624 issued to Constantine R Doumany which shows a plastic box having a downwardly extending neck around a drain opening in the bottom of the box to drain away any water leaking within the box to prevent water from escaping from the box and leaking onto adjacent surfaces and equipment.

Other similar examples of plastic boxes with bottom drains are shown in U.S. Pat. No. 4,158,471 (Logsdon) and U.S. Pat. No. 4,637,422 (Izzi, Sr).

The manufacturing of plastic boxes for specific applications such as to contain certain manifolds carrying hazardous liquids such as those containing acid materials and the like are often manufactured by hand lay up from sheet plastic materials to meet the needed requirements of the size, shape and the particular valve fittings to be mounted within a particular container. This can be very expensive and time consuming.

OBJECTS OF THE INVENTION

An object of this invention is to provide an inexpensive, easy to manufacture sealed container for a valve manifold which contains and drains away hazardous liquids which may leak from the connections of the manifold.

Another object of this invention is to provide a manufacturing method for a sealed container which can produced in mass production with a minimum of hand labor.

A still further object of the invention is to provide a container which can be mounted for use in either the vertical or horizontal position and still provide effective drainage of liquid from the bottom of the container regardless of whichever mounting position is selected.

These and other objects of the invention will become apparent in the following specification and drawings.

SUMMARY OF THE INVENTION

This invention is a valve manifold box to enclose manifolds controlling the flow of potentially hazardous liquids which need containment in the event of valve or connection leaks, the box comprising: a substantially rectangular non-metallic box having five sides integral with each other, four of said sides defining an opening; a cover panel sealingly held against adjacent edges of four of the sides to form a liquid retaining enclosure to contain any leakage from valves or connection points of a manifold within the box; and a plurality of fittings spin welded in sealing relationship to at least part of the walls; said fittings adapted to be in communication with the inside of the box and with liquid carrying tubes passing therethrough.

DESCRIPTION OF THE PREFERRED EMBODIMENTS

Figure 1:
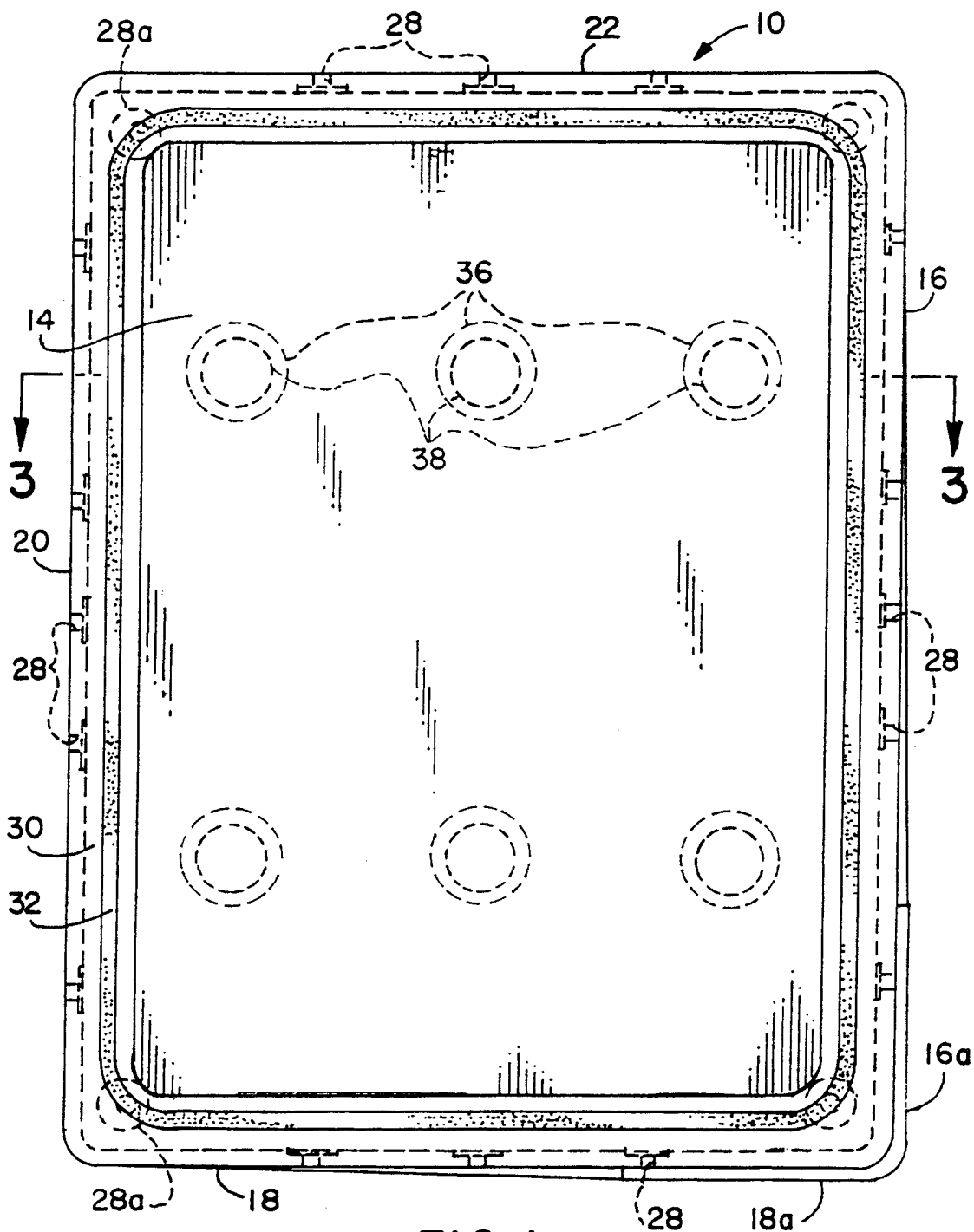
FIG. 1 is a front elevational view of a manifold box of the invention prior to attachment of access fittings.
Figure 2:
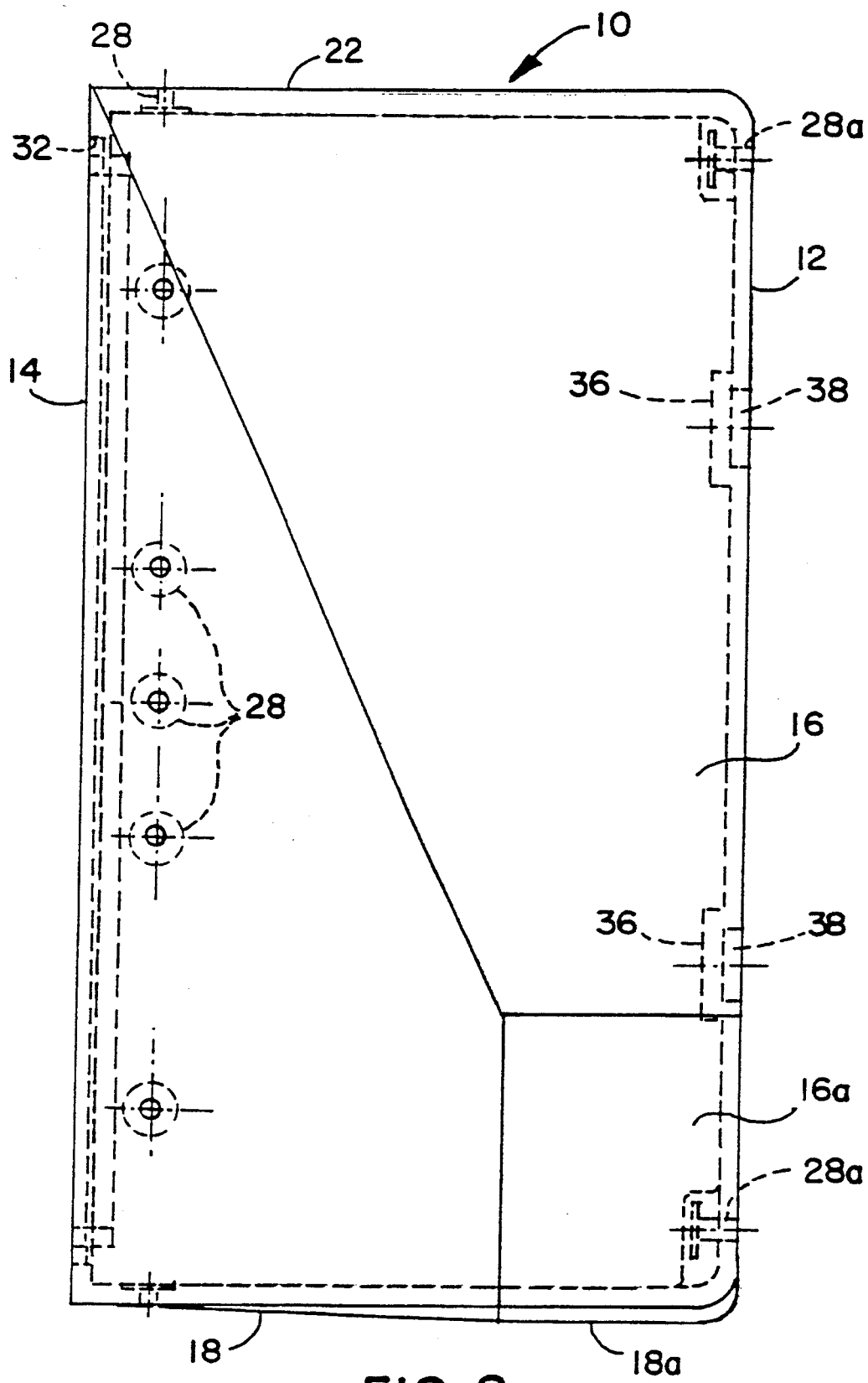
FIG. 2 is a side elevational view of the box of FIG. 1 looking at the right side thereof.
Figure 3:
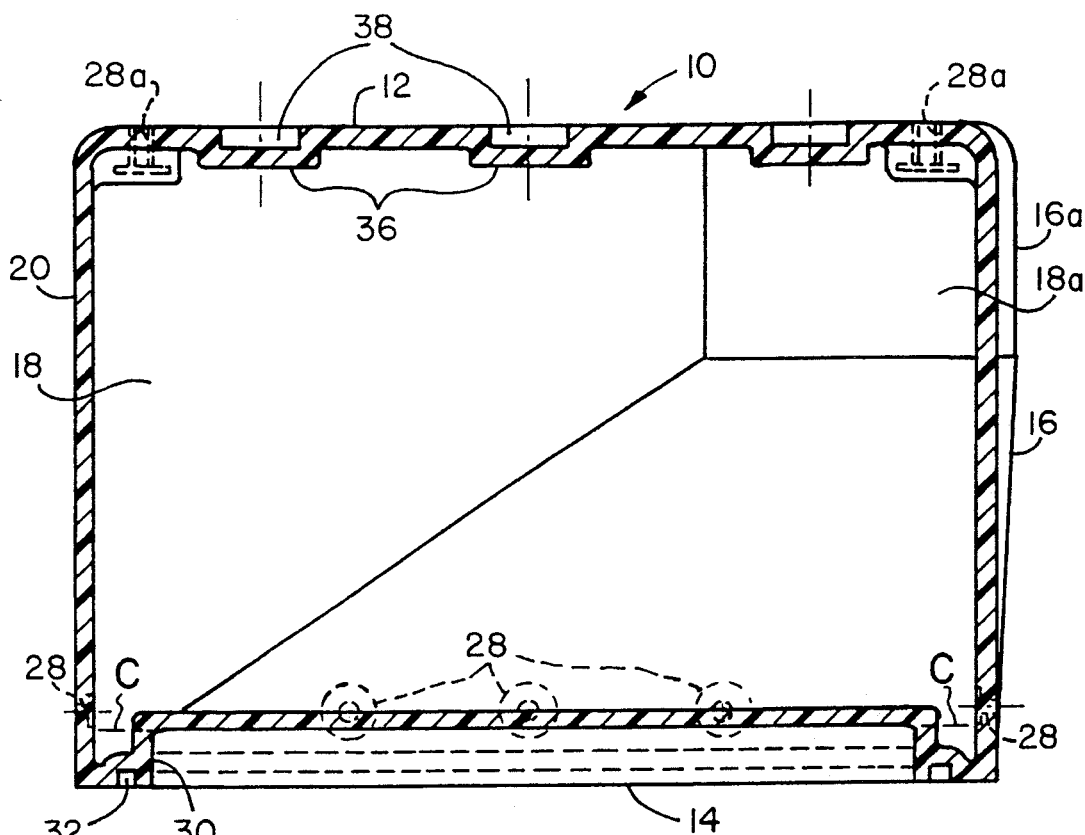
FIG. 3 is a cross-sectional view of the box of FIG. taken on line 3—3 of FIG. 1.

Referring now to the drawings and in particular to FIGS. 1–3 a manifold box is indicated generally by the numeral 10. The manifold box is of substantially rectangular shape and has a back wall 12, a front wall 14 and four side walls 16, 18, 20, and 22 formed integrally with the back wall 12 and front wall 14.

Figure 5:
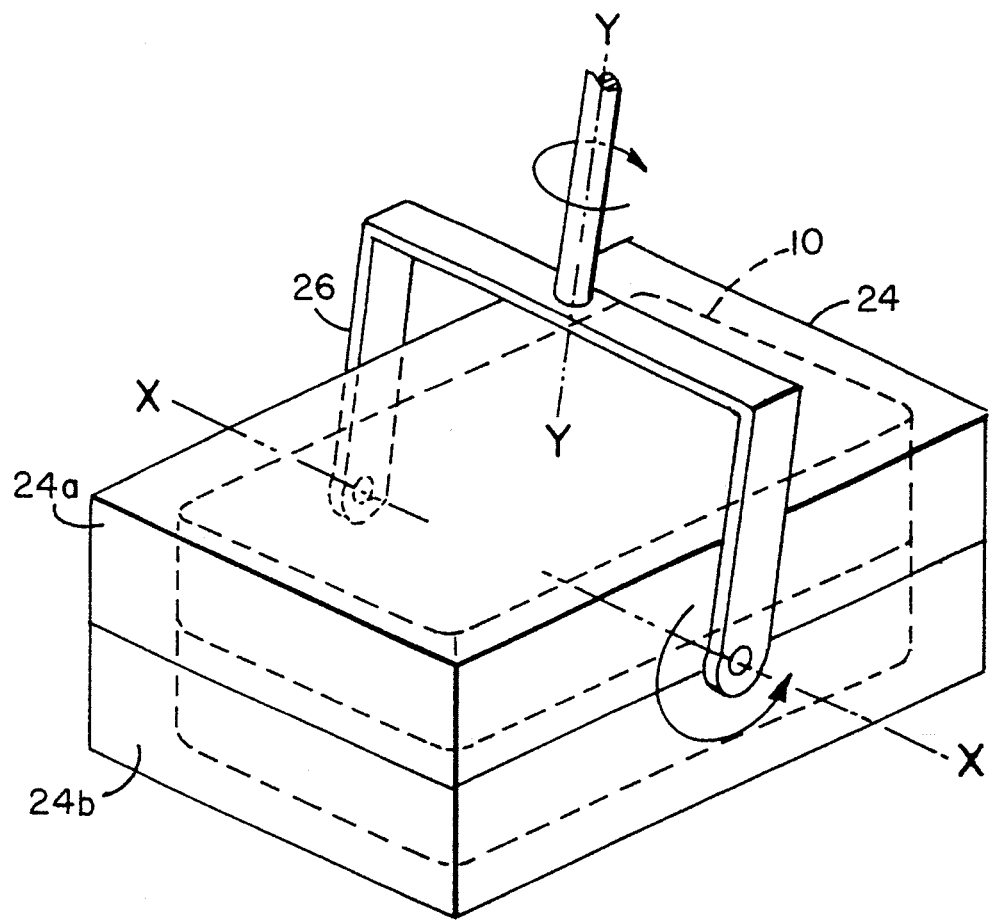
FIG. 5 is a simplified perspective diagrammatic view showing the multiple motions of a mold for rotational casting to a box such as that of FIGS. 1-4.

The box 10 is preferably made by rotational casting such as shown in a mold 24 as shown in FIG. 5. The mold is supported on a gimbal 26 which permits the mold 24 to rotate about axes "X" and "Y" which are perpendicular to each other. The box 10 is made of a non-metallic plastic material such as polyethylene, polypropylene, Teflon or other suitable material. In performing the casting a designated quantity of plastic material in liquid or pellet form is placed in the mold 26 and if pellets are used, the mold is heated to melt the pellets into liquid form. The mold 26 is then rotated about multiple axes to cause the liquid to coat the entire interior surfaces of the mold in a relatively uniform thickness of the plastic material. As soon as the material is sufficiently cooled, the mold parts 26a and 26b are separated and the cast box 10 removed from the mold.

When removed from the mold 26 the box 10 as shown in FIGS. 1–3 forms a rectangular container which is totally closed on all six sides. The box 10 contains a plurality of "tee-nuts" 28 which are cast in place during rotational casting of the box 10 at certain predetermined locations within the side walls 16, 18, 20, and 22 with the outwardly facing ends of the nuts 28 being open to receive screws and the inward ends of the nuts having flat heads sealed within the wall of the box so that the nut does not provide any open communication with the interior of the box 10. This is to prevent any liquid from leaking out of the box when it is in use with a valve manifold mounted therein. Slightly larger "tee-nuts" 28a are cast in the same manner within the back wall 12 for providing a means of attaching mounting members (not shown) for mounting the box on a vertical wall when in use.

Figure 4:
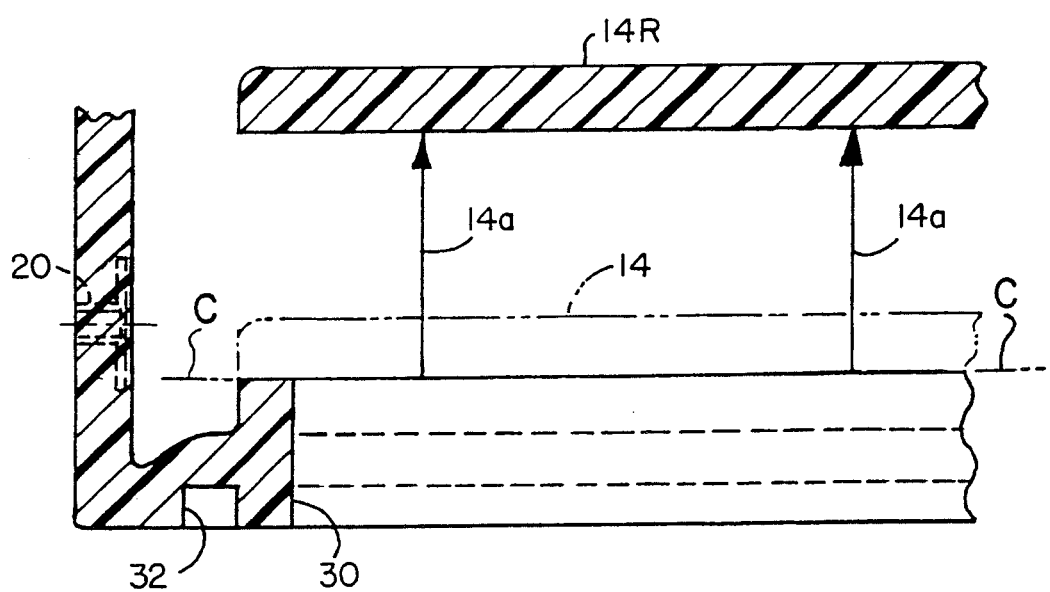
FIG. 4 is a greatly enlarged view of the lower left corner of FIG. 3 showing a flange and channel for receiving a resilient seal member.

As shown in FIGS. 3 and 4, the box 10 has a flange portion 30 having the cross-section shape of a reverse "h" extending around the front edge of the four sides 16, 18, 20 and 22 of the box. The flange portion 30 carries therein a continuous groove 32 extending around the entire rectangular extending flange 30 with the groove 32 facing outwardly to receive a resilient seal member 34 (shown in FIG. 7) extending around the entire rectangular extending groove 32.

Figure 8:
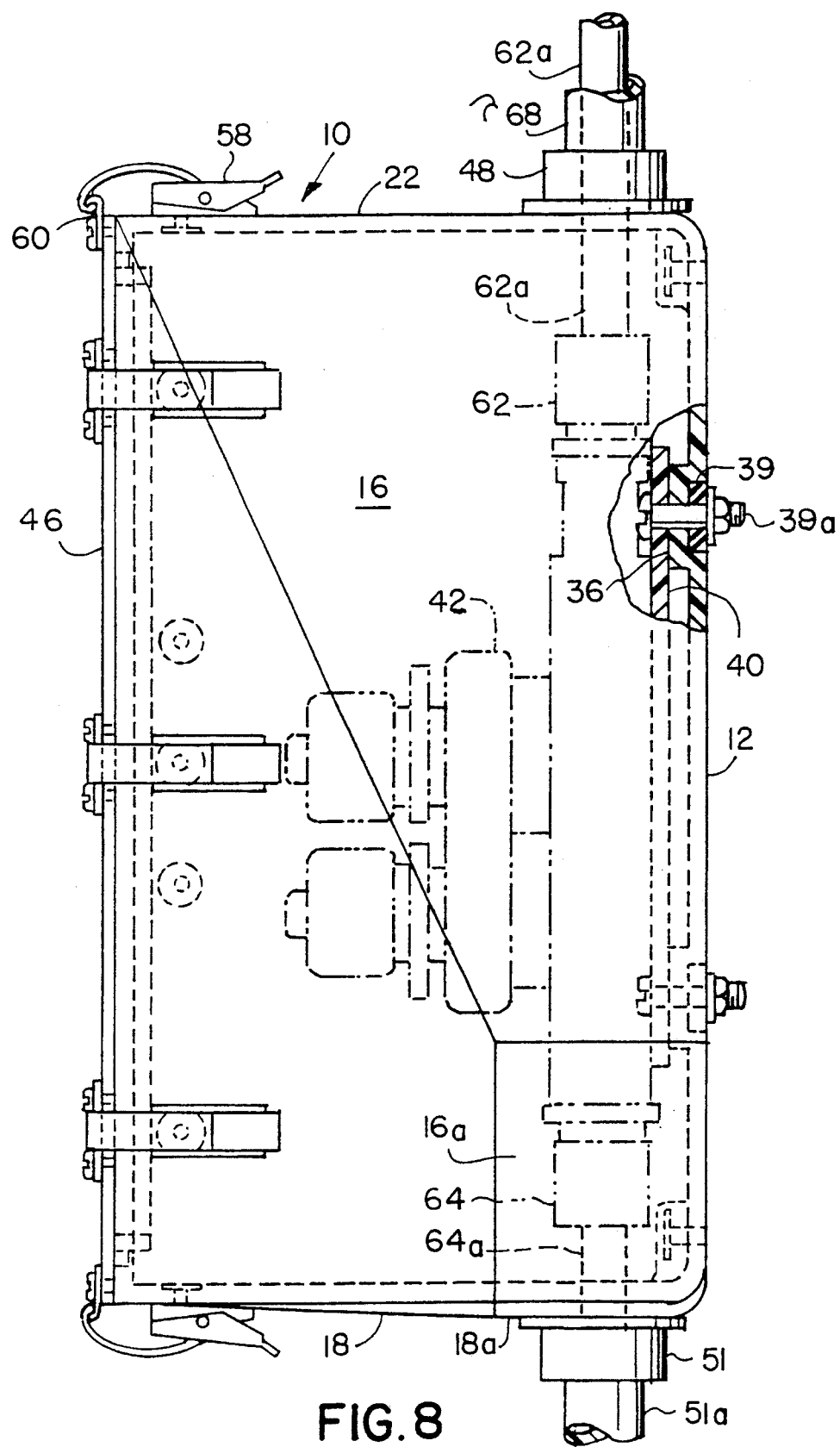
FIG. 8 is a side elevational view of the manifold box of FIG. 7.

The back wall has a plurality of circular inwardly offset portions 36 cast around mold inserts (not shown) 38 to provide rearwardly facing recesses 38 to receive disk shaped resilient seals or washers shown in FIG. 8. the offset portions 36 provide support for attaching a mounting back plate 40 for a manifold 42 as shown in FIG. 8.

Since the box is cast with all the walls totally enclosing the interior of the box 10, it is necessary to cut a front access opening in order to install a manifold inside the box. As shown in FIGS. 3 and 4, it can be seen that the front wall 14 is recessed inwardly from the flange 30. To provide the access opening the entire recessed portion of the front wall 14 is cut out on the cut line "C" and the wall 14 is removed from the position shown in chain dotted lines in FIG. 4 and moved away from the flange 30 as shown by the direction of the arrows 14a leaving only the flange portion 30 surrounding the opening 44 shown in FIG. 4. The removed front wall is indicated by the number 14R. The opening 44 bordered by the flange 30 is rectangular and leaves substantially all the front of the box 10 open until sealingly closed with a cover panel 46 (shown in FIGS. 7 and 9) which will be explained more in detail later.

After removal of the front wall 14 from the box 10, it is cut to a reduced size as needed and mounted on the inside of the back wall 12 to serve as the previously mentioned mounting back plate 40 shown in FIG. 8. The back plate 40 can be attached to the offset portions 36 by plastic bolts or other suitable means.

If needed for extra strength bolts 37 can be passed through the entire thickness of the offset portion 36 and a nut 37a applied to one end of the bolt as shown in FIG. 8.

Figure 7:
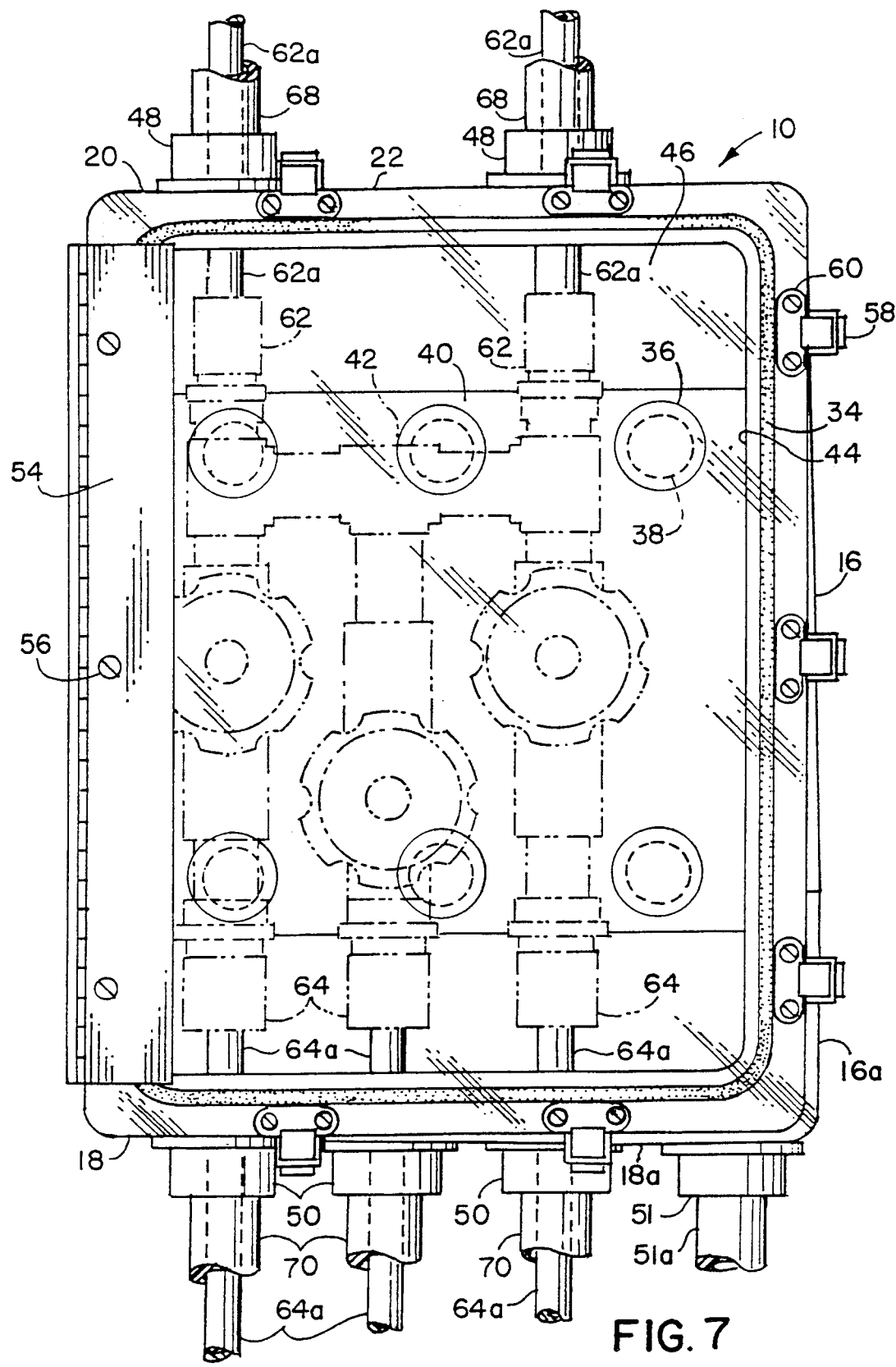
FIG. 7 is a front elevational view of a vertically mounted manifold box similar to that of FIG. 1 after installation of a front access panel and a plurality of fittings.
Figure 9:
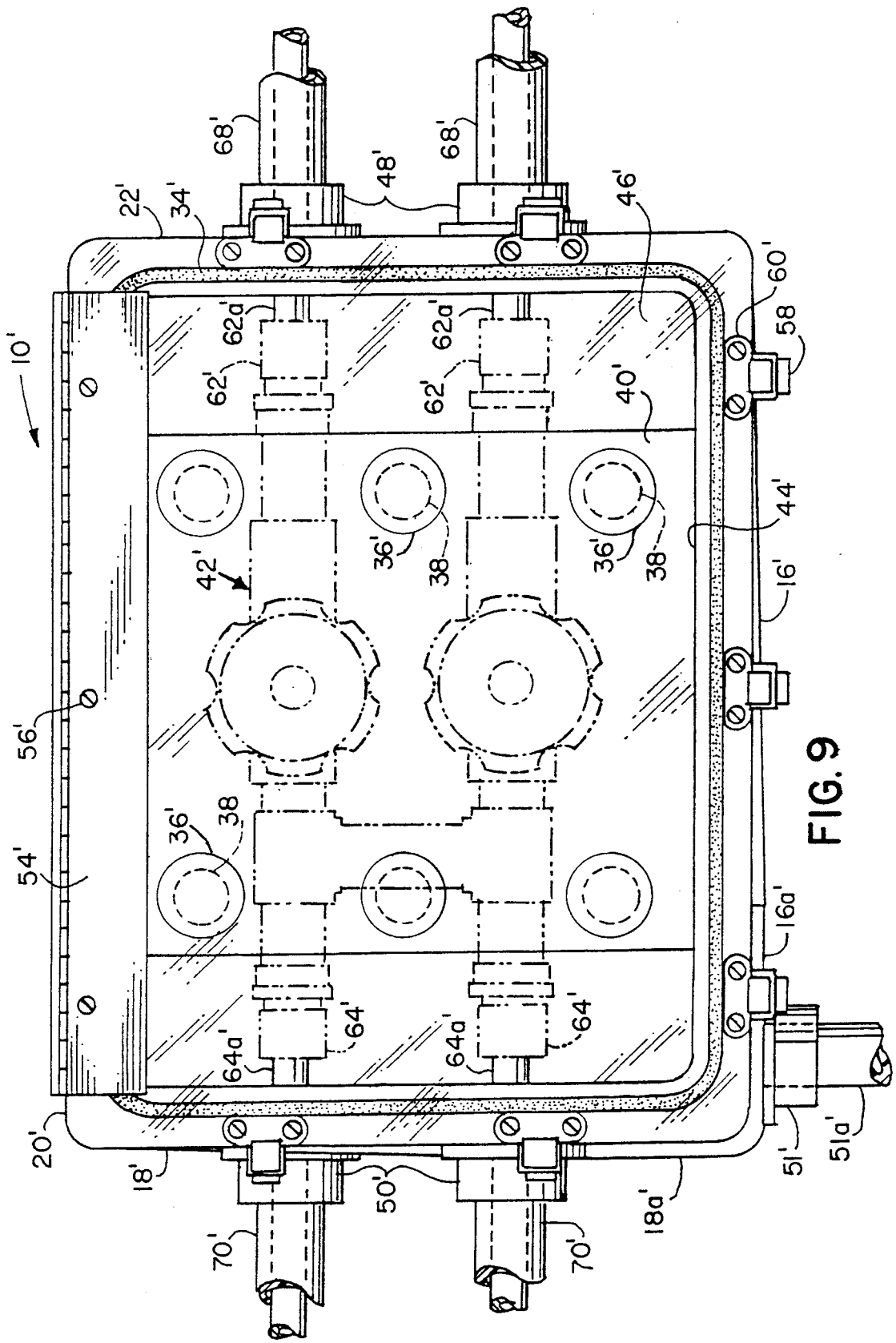
FIG. 9 is a front elevational view of a manifold box similar to that of FIG. 7 except that the box is mounted horizontally.
Figure 10:
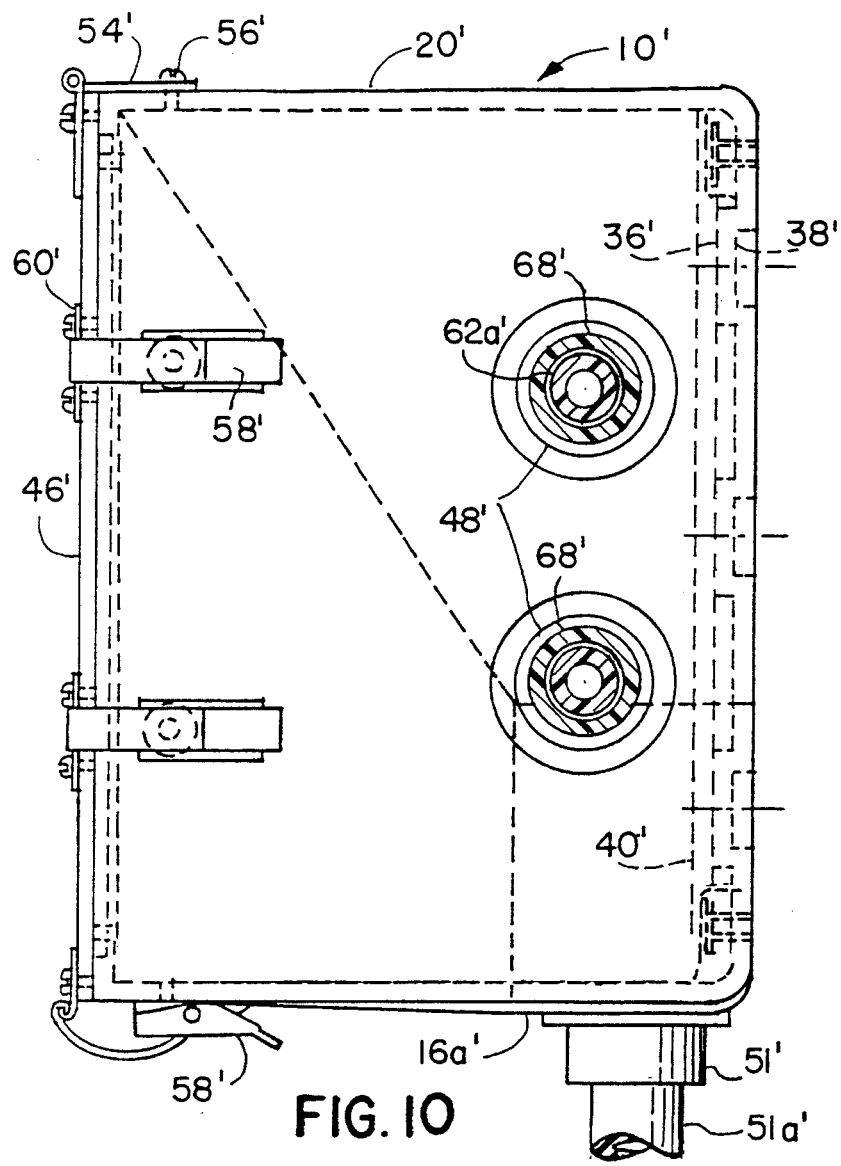
FIG. 10 is a side elevational view of the manifold box of FIG. 9.

As shown in FIGS. 1–3, two of the sidewalls 16 and 18 are sloped toward a corner with each wall having a low portion for mounting a drain fitting as will be described later. The sidewall 16 slopes to a low portion 16a and the sidewall 18 slopes to a low portion 18a. The two sloping walls 16 and 18 makes it possible to use the box 10 in a vertical position as shown in FIGS. 7 and 8 or in a horizontal position as shown in FIGS. 9 and 10 depending upon what configuration of manifold is to be mounted in the box. As long as either of the sloping walls 16 or 18 is placed as the bottom wall, then the liquid will properly drain to a corner and pass out of a drain fitting 51 and drain pipe 51a attached to the respective low portion of the bottom wall.

Referring now to FIGS. 7 and 8, it may be seen that a plurality of tubular top fittings 48 have been attached to the top wall 22 and a plurality of bottom fittings 50 have been attached to the bottom wall 18. The fitting 51 serves as the drain connection mounted in the low portion 18a of the bottom wall 18 which holds the drain pipe 51a.

Figure 6:
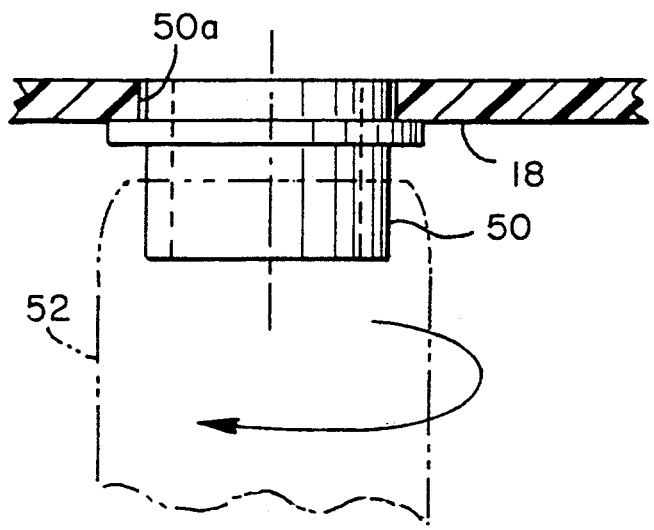
FIG. 6 is a fragmentary cross-sectional view through a portion of one of the walls of a box such as that shown in FIGS. 1-4; showing a fitting being attached to the wall by spin welding to extend through a hole cut therein.

These fittings are attached to the walls of the box 10 by first drilling holes through top wall 22 and bottom wall 18 at the desired locations and then spin welding the fittings in the holes as shown in FIG. 6 were for example a bottom fitting 50 is inserted in a hole 50a of bottom wall 18 and spun at high speed by a rotating chuck 52 thereby generating heat which melts a sufficient amount of the contacting plastic surfaces to cause the fitting 50 to be fused to the wall 18 and to seal the fitting 50 in the hole 50a. The drain fitting 51 is also attached in the same manner.

The cover panel 46, made preferably from a clear plastic material such as polyvinyl chloride, is attached to the sidewall 20 by a piano type hinge 54 which has one leaf attached to the sidewall 20 by screws 56 which engage the "T" nuts 28 and other leaf of the hinge like wise attached to the cover panel by similar screws 28 and nuts.

Figure 11:
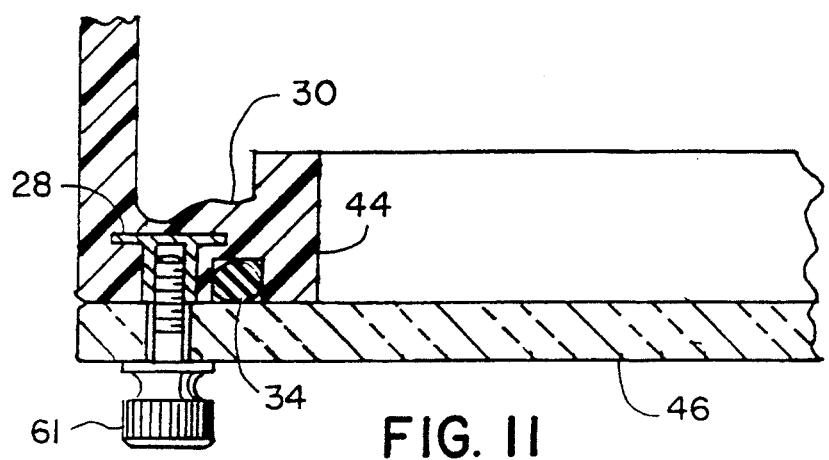
FIG. 11 is a greatly enlarged view of a corner of a box similar to FIG. 4 but showing thumb screws to fasten an access panel in place as any alternative to latches.

The "T" nuts 28 located in the sidewalls 16, 18 and 22 receive screws 56 which fastens over center latches 58 to the sidewalls to engage keepers 60 similarly attached to the cover panel 46. Thus it can be seen that the cover panel 46 provides a hinged see-through cover which can be sealing closed and held against the resilient seal member 34 which is held in place by latches 58 to contain any liquid material leaking from the manifold 42. Other fasteners such as knurled thumb screws 61 as shown in FIG. 11, may be used as alternatives to the latches 58. In addition the cover panel 46 can be made totally removable instead of being hinged by removably fastening it to the box 10 entirely by the screws 61, by clamps 58 or other suitable means.

The manifold 42 consists of a series of interconnecting pipes and valves which need not be described in detail and has upwardly extending connections 62 communicating with tubes inner 62a which extend through fittings 48 and downwardly extending connections 64 communicating with inner tubes 64a passing through fittings 50. The inner tubes 62a and 64a are made preferably of Teflon. The tubes 68 and 70 made preferably of polyvinyl chloride, serve as outer tubes which surround inner tubes 62a and 64a respectively as the tubes 62a and 64a continue outside the fittings 48 and 50. The inner tubes 62a and 64a carry the liquid flowing through the system, while the outer tubes 68 and 70 contain any leakage which may occur. The outer tubes 68 and 70 sealingly engage the fittings 48 and 50 so that no leakage within the box 10 passes onto adjacent surfaces outside of the box where tubing passes through the fittings.

In a completed assembly, the inner tubes 62a and 64a extend outwardly from the connections 62 and 64 to carry liquids to and from the manifold 42. The tubes 62a and 64a are sealed to their respective connections and fittings to prevent any leakage of liquid from the box 10 and any leakage occurring inside the box 10 only passes through the drain fitting 50a.

Referring now to FIGS. 9 and 10, a box 10' is shown which is substantially identical to the box 10 of FIGS. 7 and 8 except that it is positioned with the longer walls 16' and 20' being positioned horizontally instead of vertically. Since the assembly of the various components of the box 10' is substantially identical to that of box 10 the assembly will not be described in detail in the interest of brevity, and the identical parts will be given the same numbers followed by a prime (').

In box 10', the bottom wall 16' is sloped to a low portion 16a' in which a drain fitting 50a' is connected to provide drainage of any leaking liquid from inside the box 10'. With the box 10' in a horizontal position, this means that the fittings 48' and 50' are mounted on sidewalls 18' and 22' instead of on the top and bottom walls as is the case of box 10 in FIGS. 7 and 8.

Figure 12:
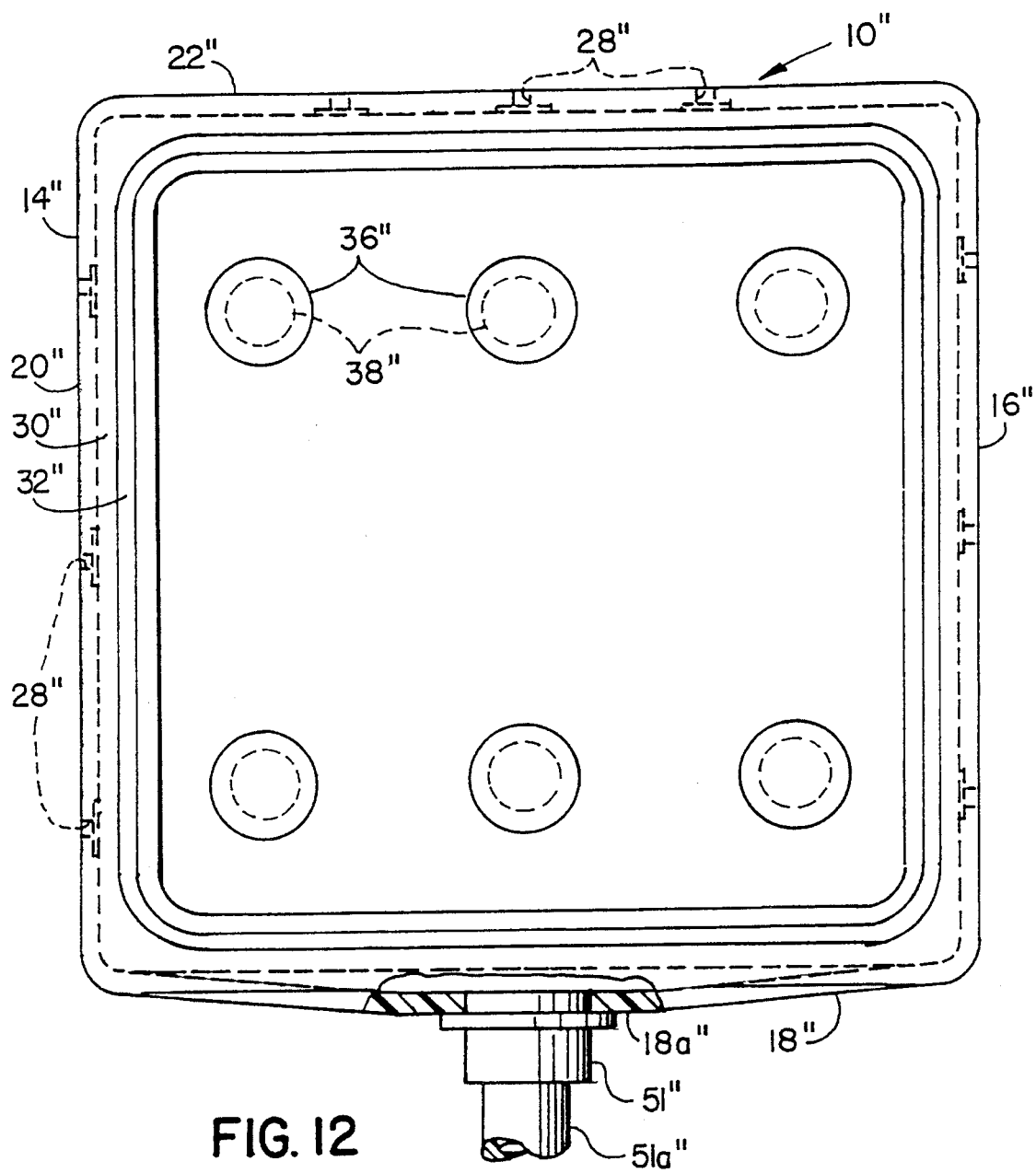
FIG. 12 is a front view of another embodiment of the invention similar FIG. 1 but showing a square box instead of a rectangle.

FIG. 12 shows another modification of a box 10" similar to the box 10 in FIG. 1 except that the sides 16", 18", 22" and 22" are all the same length forming a square box instead of a rectangle. Since the box 10" is square, there is no reason to select more than one of the sides as the bottom side. Only the bottom side 18" needs to be sloped for drainage to a low center portion 18a" to which is attached a drain fitting 51" and a drain pipe 51a". The box 10" in FIG. 12 is shown after the front access opening 44" has been cut in the front wall 14".

The remaining fittings and cover plate can be attached to the walls of the box 10" in the same manner as previously described in FIGS. 7 and 9.

Thus it may be seen that the boxes 10, 10' and 10" are cast as the same identical type box and vary only in the manner in which they are positioned either vertically or horizontally if rectangular or in the case of the box 10" the box will be square.

In all the embodiments shown, the locations of fitting which are attached to the walls of the boxes 10, 10' or 10" may vary to suit the particular needs of the configuration of manifold being contained within the box.

Variations can be made in the, materials used, locations of "T" nuts and fittings and the manner of attaching the front cover panel 46 and manifold 42 without departing from the scope of the invention.

I claim:

1. A valve manifold box to enclose manifolds controlling the flow of potentially hazardous liquids which need containment in the event of valve leaks, the box comprising:
   a non-metallic box having five sides integral with each other, four of said sides defining an opening;
   a cover panel sealingly held against adjacent edges of four of the sides to form a liquid retaining enclosure to contain any leakage from valves of a manifold within the box; and
   a plurality of fittings spin welded in sealing relationship to at least part of the walls;
   said fittings adapted to be in communication with the interior of the box manifold and with liquid carrying tubes connected thereto.

2. A valve manifold box as claimed in claim 1 wherein the cover panel is hinged along one of its edges to an adjacent edge of one of the sides of the box.

3. A valve manifold box as claimed in claim 2 wherein the edges of the cover panel except for the edge hinged to the box are releasably held against the box by a fastening means.

4. A valve manifold box as claimed in claim 1 including a plurality of "tee nuts" molded in place in the sides of the box.

5. A valve manifold box as claimed in claim 1 wherein at least one of the sides is tapered toward a drain port in the side, said tapered side to serve as a bottom of the box.

6. A valve manifold box as claimed in claim 1 wherein a drain pipe is sealingly attached to the drain port to receive liquid from inside the manifold box through the drain port.

7. A valve manifold box to enclose manifolds controlling the flow of potentially hazardous liquids which need containment in the event of valve leaks, the box comprising:
   A non-metallic molded box having a back wall, two side walls, a top wall and a bottom wall;
   the top, bottom and side walls defining a front opening lying opposite to the back wall;
   a front cover panel sealingly covering the opening to prevent leakage of liquid from the box, the
   front cover panel being capable of being opened to provide access to the interior of the box;
   at least one wall of the box containing a drain port and said wall being sloped toward the drain port;
   a plurality of spin welded fittings sealingly attached to at least part of the walls to provide connections for liquid carrying tube members; and
   means attaching a manifold assembly inside the box, whereby said manifold assembly is adapted to be in communication with the liquid carrying tubes extending through the spin welded fittings.

8. A valve manifold box as claimed in claim 1 including a plurality of "tee nuts" molded in place in the walls of the box.

9. A valve manifold box as claimed in claim 1 wherein the front cover panel is hinged along one edge to operate as a front door on the box.

10. A valve manifold box as claimed in claim 9 including fastening means to hold the front cover plate in sealing relationship against edges of at least part of the walls surrounding the front opening in the box.

11. A valve manifold box as claimed in claim 10 wherein the fastening means are located along three edges of the walls except for the edge which contains a hinge which attaches the front cover panel to the box.

12. A valve manifold box as claimed in claim 10 wherein the fastening means are over center latches which engage keepers attached to the front cover panel.

13. A valve manifold box as claimed in claim 10 wherein the fastening means are knurled screws extending through the front cover plate and into "tee nuts" in the box.

14. A valve manifold box as claimed in claim 1 wherein two adjacent side walls of the manifold box are both sloped toward a drain port thereby enabling the manifold box to be mounted with either of the two side walls being either vertical or horizontal so that either of the two sidewalls may serve as the bottom wall of the manifold box.

15. A valve manifold box as claimed in claim 1 wherein the molded box is made of plastic material.

16. A valve manifold box as claimed in claim 1 including a mounting plate secured to the back wall of the molded box for mounting a manifold thereon.

17. A valve manifold box as claimed in claim 16 wherein the mounting plate is made from the same material as the molded box.

18. A valve manifold box as claimed in claim 1 wherein the box is rectangular.

19. A valve manifold box as claimed in claim 1 wherein the box is square.

* * * * *